July 14, 1942.   C. F. WEINREICH   2,289,613
ICE CREAM FREEZER AND AGITATOR THEREFOR
Filed Oct. 26, 1939   4 Sheets-Sheet 1
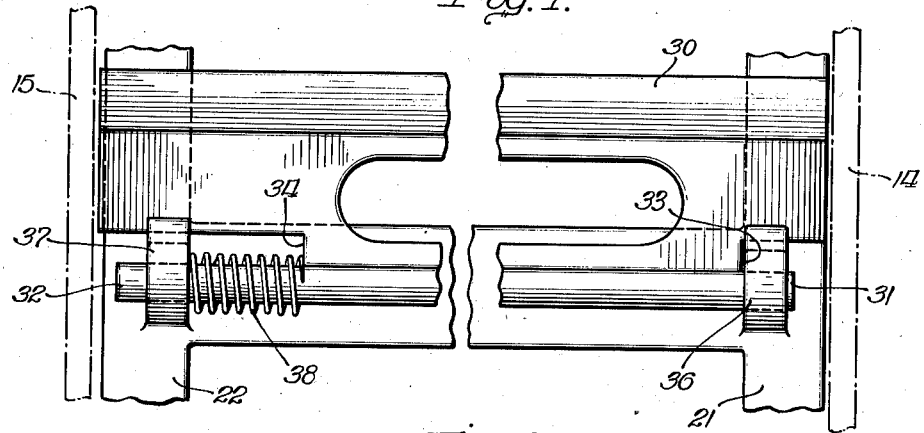
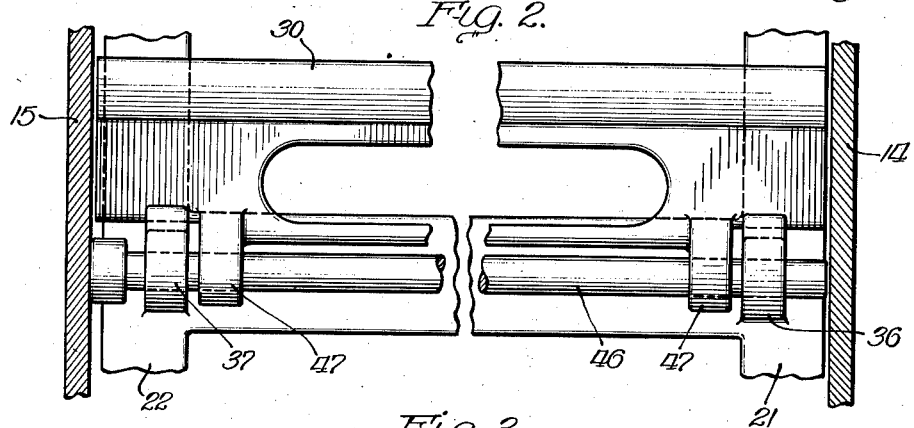
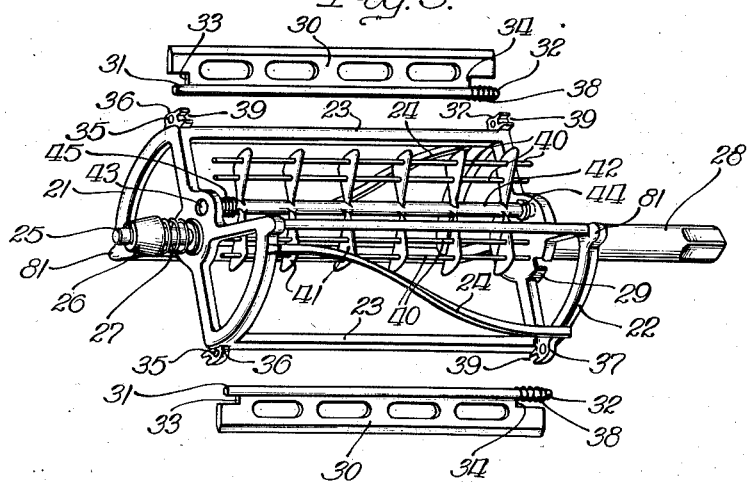
INVENTOR.
Charles F. Weinreich
BY
ATTORNEY.

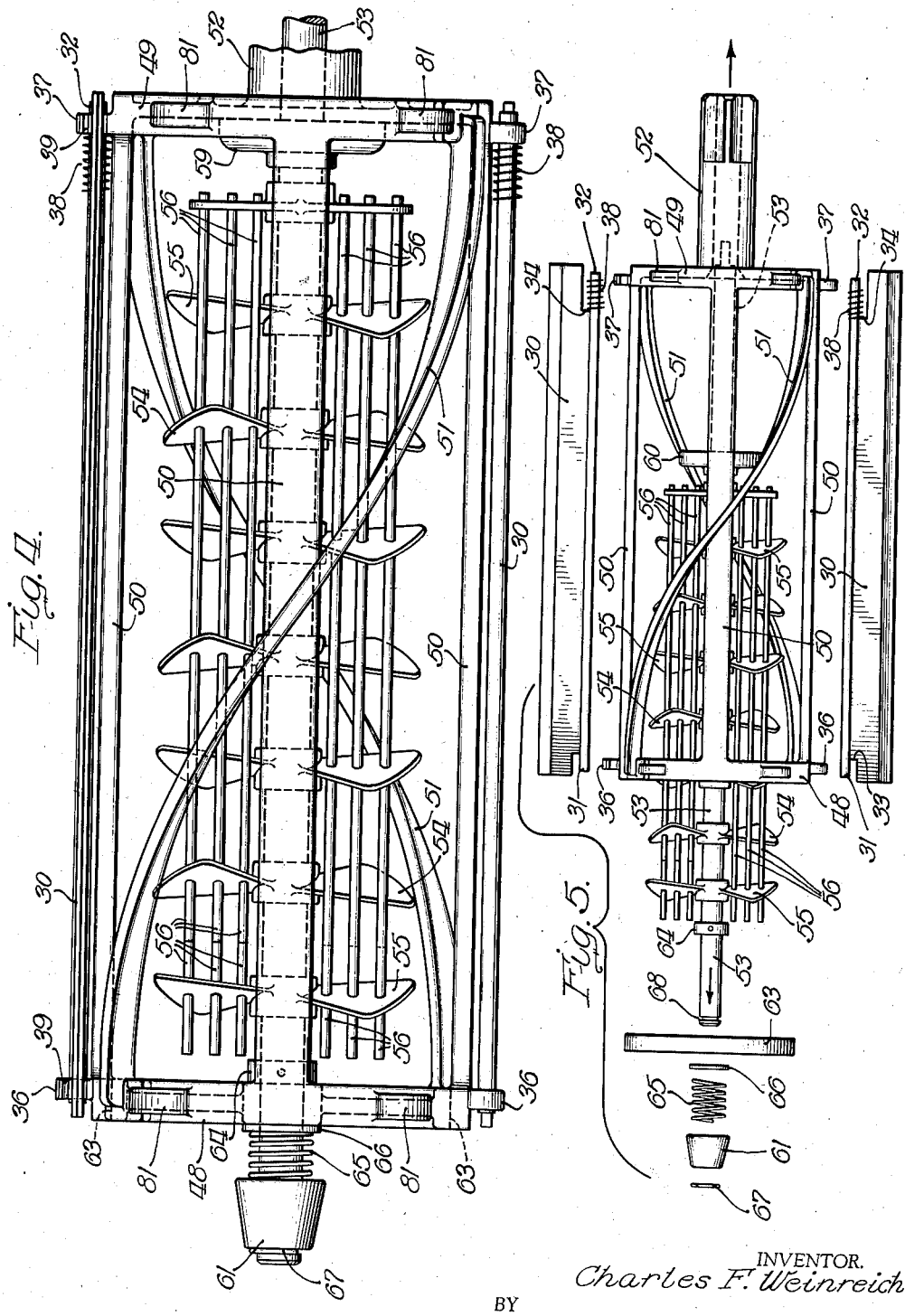

July 14, 1942.  C. F. WEINREICH  2,289,613
ICE CREAM FREEZER AND AGITATOR THEREFOR
Filed Oct. 26, 1939  4 Sheets-Sheet 3

INVENTOR.
Charles F. Weinreich
BY
ATTORNEY.

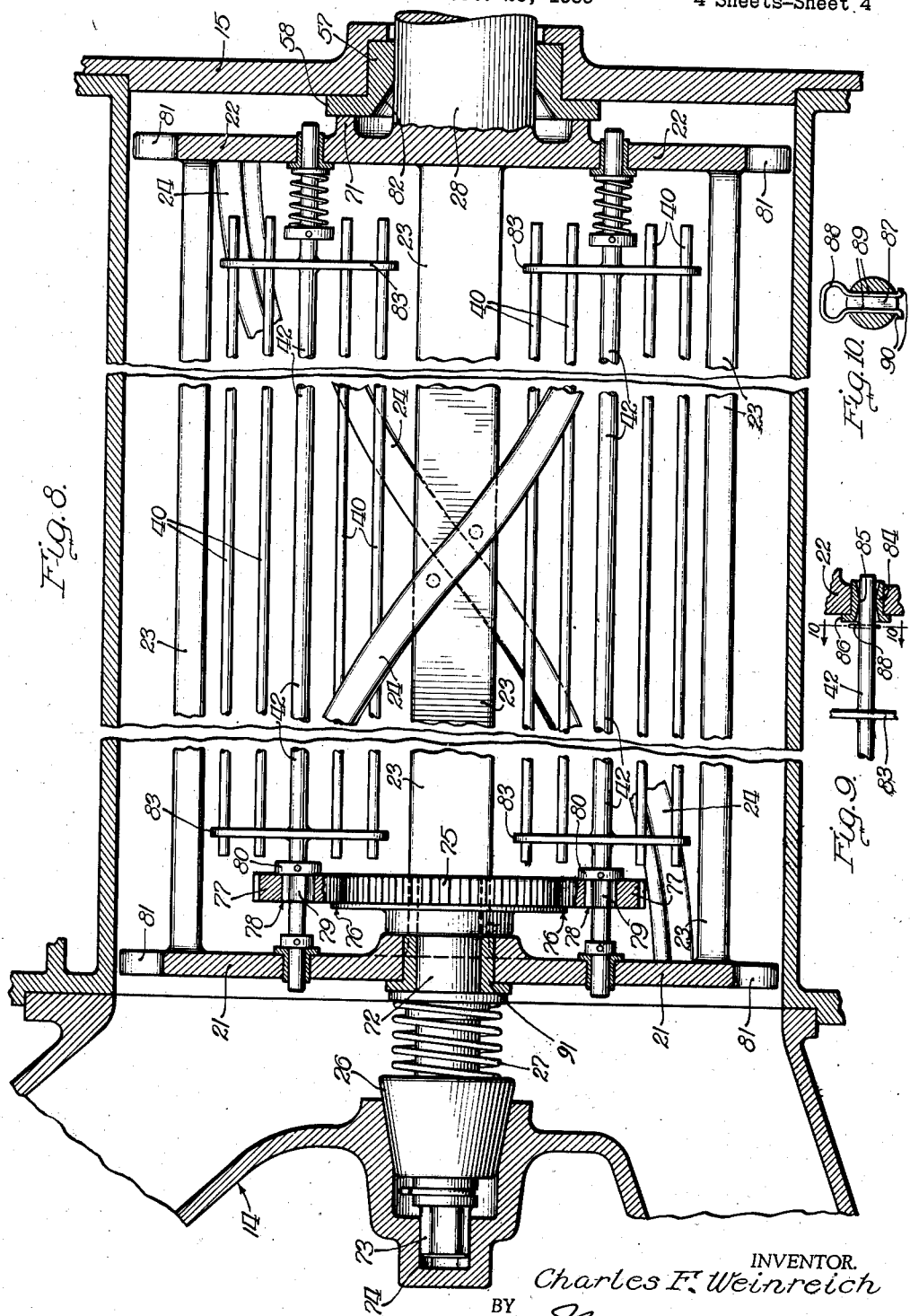

Patented July 14, 1942

2,289,613

UNITED STATES PATENT OFFICE 2,289,613

ICE CREAM FREEZER AND AGITATOR THEREFOR

Charles F. Weinreich, Des Plaines, Ill., assignor to Cherry-Burrell Corporation, Wilmington, Del., a corporation Application October 26, 1939, Serial No. 301,490

6 Claims. (Cl. 259—105)

The present invention relates to processing devices such, for example, as confection freezers, more generally referred to as ice cream freezers. More particularly this invention relates to a new and novel sanitary agitator or scraping and whipping mechanisms for ice cream freezers, and to the sanitary construction and arrangement of the supports for the parts of the agitator having readily detachable scraping and whipping elements, and to the construction of agitators comprising separable elements to facilitate easy assembly within the processing chamber and easy cleaning of the individual members.

In confection freezers and especially in ice cream freezers it is of great importance, due to the perishable nature of the material processed therein, that sanitary constructions be employed throughout the freezers and parts thereof. Obviously the agitator member of the processing machine or freezer comprises probably the most important element for consideration of sanitary construction features.

In many types of agitators for use in ice cream freezers the agitator consists of a rotatable cage-like construction upon which various unloading, scraping and whipping members are pivoted in fixed relation thereto. In some instances driving members individual to one or more of the separate elements of an agitator, particularly the whipping or beating members, are also incorporated. In some instances also the whipping or scraping elements are removable from the agitator frame but only after the removal of unsanitary screws, etc., usually employed to maintain bearing means in supporting position.

In the construction of ice cream freezer agitators it is highly desirable that the entire assembly be sanitarily mounted and sealed in the processing chamber when in condition for operation. It is also and equally essential that the entire assemblage be easily and quickly removable from the processing chamber and that the portions of the assembled mechanism which comprise the various independently movable elements, such as scrapers, whippers or beaters, be swiveled for motion and easily removable from their supports in the agitator frame without necessitating the use of unsanitary screws, etc., to enable the thorough cleaning of all parts normally inaccessible in an assembled mechanism not provided with the readily detachable elements. It is also important that, when the agitator mechanism is disassembled, all portions of all of the individually movable elements usually fixed to the support members of the agitator by pivots, etc., be free of unsanitary crevices and also that the pivot elements and other supporting structure, which, in prior designs, have not normally been easily accessible for cleaning, be freely exposed.

In some sizes of agitators it is also desirable to construct the agitator of separable elements to enable the assembly of the separable elements of the agitating mechanism in the processing chamber. Such construction avoids the difficulty normally incurred in assembling large agitators in processing machines which, due to their size, are usually heavy and awkward to handle. It is a very common occurrence that, due to the difficulty of such handling, the operator may be injured or the smooth freezing surface of the interior of the cylinder or the sealing and bearing means injured in the assembly of the heavy agitator members in the processing chamber.

The principal objects of the present invention, therefore, are to provide an agitator for an ice cream freezer of simple, sanitary design in which the swiveled scraping and whipping elements are firmly but removably retained in their operative position upon the supporting member; in which the removable elements of the agitator are removably retained in place without the use of screws or other unsanitary elements by biasing or otherwise retaining these members in operative position by readily removable locking means and retaining these members in such position by springs or other suitable means such, for example, as clip rings or keys; and in which the apertures in the freezing cylinder and end plates through which the agitator driving shaft enters are sealed by a rotary seal maintained in sealing position by the same resilient means or locking means which maintains the agitator and parts thereof in operative position within the cylinder.

A further object of the invention is to provide an agitator consisting of separable inner and outer members in which the separate elements may be assembled in separate parts into the freezing chamber and may be disassembled or dismantled in its separate parts from the freezing chamber to thereby avoid the difficulty of handling large and heavy, completely assembled agitator mechanisms of the type now common in the industry for large freezers.

An additional object of the present invention is to provide an agitator mechanism in which the entire mechanism is driven as a unit; in which some of the individual elements are separately driven by driving means housed entirely within the processing chamber thereby reducing to a minimum the number of driving elements extending out of the processing chamber; and in which the separately driven elements are mounted on the agitator frame in order that one or more may be separately removed without affecting the operativeness of the remaining separately driven element or elements.

These and other objects and purposes and other important features will be apparent from the following description when read in connection with the accompanying drawings in which:

Figure 1 is a side view of a scraping blade pivotally mounted in lugs on the agitator and biased by a spring to retain it in proper position.

Figure 2 is a side view of an additional modification of a scraping blade pivoted to lugs on the agitator by means of a bolt or shaft element extending through complementary lugs on the scraping blade.

Figure 3 is a perspective view showing the improved pivoted mountings for the scraping blade and the whipping or beating member of the agitator in which the whipping or beating member is also eccentrically mounted in the form of a reaction beater.

Figure 4 is an elevation of another modification of the improved dasher in which the dasher consists of two main separable elements.

Figure 5 is a disassembled view of the agitator mechanism shown in Figure 4 in which the separable elements are shown in relative order of assembly.

Figure 8 is an elevation showing a modified construction of the improved dasher with independently driven whipping or beating members, part of the dasher being broken away and part being shown in section.

Figure 9 is a fragmentary elevation, partially in broken-away section, of the end of the beater blade shaft pivoted in the rear spider of the agitator, showing a modified bearing and sanitary locking key to maintain the beater blade in operative position instead of the bearing spring shown in Figure 8.

Figure 10 is an elevational view of a cross section taken along line 10—10 of Figure 9.

Figure 6:
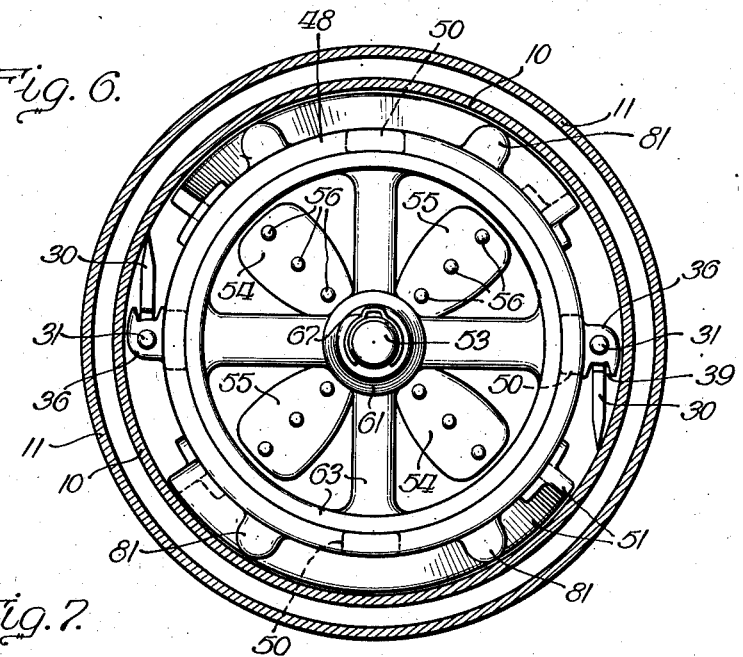
Figure 6 is a sectional view taken through the front end of the freezing chamber housing the improved agitator mechanism shown in Figure 4.

Referring to the illustrations showing the invention, in which illustrations like numerals are associated with like elements, 10 is a cylinder defining the processing chamber or freezing tube which is enclosed in a jacket 11 forming a refrigerant passage between the outer periphery of the cylinder 10 and the inner periphery of the jacket 11. The refrigerant is introduced into and discharged from this passage through conduits 12 and 13, respectively.

The front end of the processing chamber defined by the cylinder 10 is closed by a closure or door 14 and the head or rear end of the cylinder is closed by an apertured head 15. Head 15 is provided with a central aperture defined by bearing neck 16.

This construction of freezing tube and refrigerant enclosing jacket, as well as of the closures for the end of the cylinder or freezing tube, is more or less of the general type common in the art and, in the conventional manner, the processing chamber assemblage is supported on a base 17 upon which base and to the rear of the cylinder 10 is also supported the housing 18 in which are housed the various driving gears 19 and 20 to which the agitator elements on the interior of the cylinder 10, if they are separately power driven, are operatively connected through shaft means extending through the aperture in the head 15. The driving gears 19 and 20 are powered in the conventional manner by any desired arrangement such, for example, as electric motors, which do not comprise a part of the instant invention and are, therefore, not shown.

The agitator mounted within the cylinder 10 in one of the embodiments of this invention, as illustrated in Figures 1 to 3 inclusive, comprises a cage-like, rigid, rotatable member or body having front and rear supporting spiders 21 and 22, respectively, longitudinal spider connecting members 23 and spiral unloading bars 24 fixed at either end to the spiders 21 and 22. A front central pivot shaft 25 is fixed to the center of the front spider for pivotally supporting the front end of the rotatable agitator mechanism when mounted in the processing chamber.

To enable the satisfactory support of the front end of the agitator assembly, a tapered bearing 26 is swiveled on shaft 25 and biased away from the front spider by spring 27 also telescoped over shaft 25. The head or rear end of the agitator mechanism is supported by the agitator drive shaft 28 fixed centrally to the rear agitator spider 22 which is also provided with a centrally positioned rotary seal element 29 adapted to engage the head 15 of the freezing cylinder on the inner surface thereof and about the aperture therein through which aperture the drive shaft 28 extends, thereby sealing the aperture.

The scraping blades 30 are pivotally mounted or swiveled to the agitator cage structure by means of pivots 31 and 32 extending from offsets or thrust bearings 33 and 34 at the rear portion of the blades 30 and swiveled in bearing apertures 35 in the radial projections 36 and 37 on the spiders 21 and 22, respectively.

As is clearly manifest from Figures 1 to 3, the offset or thrust bearing 34 is considerably larger than the offset or thrust bearing 33. In like manner the pivot 32 is also longer than the pivot 31. The coil spring 38 is telescoped over the pivot 32. When the blades 30 are pivoted in the bearing apertures 35 the spring 38 is compressed, thereby urging the offset shoulder or thrust bearing 33 against the radial projection 36. When the blades 30 are swiveled in the bearing apertures 35 the ends of the blades 30 which extend past the offset shoulders 33 and 34 pass through the keys 39 in the radial projections 36 and 37 on the spiders 21 and 22, respectively, thereby limiting the possible pivotal motion of the blades 30.

The agitator shown in Figure 3 is provided with two scraping blades positioned diametrically opposite one another. These blades are assembled onto the agitator mechanism by first inserting pivot 32 into the aperture 35 in the radial projection 37 on the rear spider 22 until spring 38 is sufficiently compressed to permit the insertion of pivot 31 at the opposite end of the scraping blades into the aperture 35 of the projection 36 on the spider 21.

The offset shoulder 33 in the front end of the scraping blades 30, being closer to the end of the blades than the offset shoulder 34 at the opposite end of the blades 30, will not permit spring 38 to bias or urge the scraping blades 30 forward a sufficient distance to permit the disengagement of the pivot 32 from the aperture 35 in the projection 37. To disassemble the scraping blades 30 from the agitator mechanism, the reverse procedure to that just described above is followed. The scraping blades 30 to which the pivots 31 and 32 are fixed are moved rearwardly until the spring 38 is sufficiently compressed to permit the removal of the pivot 31 from the aperture 35 in the projection 36 on the front spider 21. When this has been accomplished the rear pivot 32 is withdrawn from its bearing aperture 35 in the rear spider 22.

To avoid any possibility of the scraping blades 30 becoming disengaged when the agitator mechanism is in operative position in the freezing tube, an additional precaution over and above the described structural features may be taken by making the scraping blades 30 and the pivots 31 and 32, as well as the offsets 33 and 34, all of such proportion with respect to the distance between the cylinder head 15 and the cylinder door 14 that, when the door 14 is closed, it is impossible to move the blades 30 longitudinally a sufficient distance before parts thereof engage the head 15 to enable the disengagement of the pivot 31 from its bearing aperture in the front spider 21. It is, however, also to be remembered that the offset 33, as previously described, at the front end of the scraping blades 30 is of such a depth that, when the agitator is in operative position within the freezing cylinder 10, the offset shoulder 33 will engage the projection 36 on the front spider 21, thereby limiting the possible longitudinal motion of the scraping blades 30 resulting from the bias of the spring 38. By this arrangement the contact between the end of the scraping blades 30 and the door of the freezing cylinder 10 which would result in a scraping action on the head 15 or door 14 is prevented.

The agitator mechanism shown in Figure 3 is also provided with a reaction type whipping or beating mechanism comprising rods 40 carried by blades 41 which are mounted fixedly in symmetrically spaced relation on the mid-section of a longitudinally extending supporting shaft 42 which is swiveled at either end in eccentrically positioned apertures 43 in the front and rear spiders 21 and 22, respectively.

The whipping mechanism is also removably mounted similarly to the manner in which the removable scraping blades 30 are mounted on the agitator mechanism and for this purpose shaft 42 is provided with a fixed collar thrust bearing 44 to engage the inner face of the rear spider 22. A spring 45 is telescoped over the opposite end of the shaft 42 and is compressed between the hub of the front beater blade 41 and adjacent face of the front spider 21. It is, of course, to be understood that the aperture 43 may also be provided with fixed or removable bushings or bearings and that anti-friction members such as washers may be used to advantage at either end of the compression spring 45.

To assemble the reaction type beater or whipper in the framework of the agitator, which framework includes the front and rear spiders 21 and 22, it is only necessary, after telescoping the spring 45 over the front end of the shaft 42, to then insert this front end of the shaft 42 in the aperture 43 in the front spider 21 a sufficient distance to enable the insertion of the opposite end of the shaft 42 in the eccentrically positioned aperture 43 in the rear spider 22. The shaft 42 is of such a length with respect to the distance between the ends 15 and 14 of the cylinder 10 that, when the agitator is assembled within the processing chamber 10 and door or end 14 closed, the shaft 42 cannot be moved a sufficient distance longitudinally to enable removal of the end of the shaft 42 from its apertured bearing 43 in the rear spider 22. Due to the collar 44 on the shaft 42 longitudinal motion of the shaft 42 in the other direction is impossible.

In Figure 2 is shown a modification of the scraping blades 30 shown in Figure 1. Like the scraping blades 30 shown in Figure 1, the modified scraper shown in Figure 2 is pivoted to swivel in apertures 35 in projections 36 and 37 in the front and rear spiders 21 and 22 of the agitator assemblage. The modification of the scraping blades shown in Figure 2 is swiveled to the projections on the front and rear spiders 21 and 22 by a longitudinally extending bolt or shaft 46 which extends through the apertures 35 in the radial projections 36 and 37 and through apertures in complementary projections 47 extending from the rear edge of the scraping blades 30 and positioned between and immediately adjacent the radial projections 36 and 37 on the spiders 21 and 22. By this arrangement the possible longitudinal motion of the blades 30 is prevented by the engagement of the projections 47 with the projections 36 and 37. The bolt or shaft 46 is of such a length as to extend substantially throughout the entire length of the cylinder 10 intermediate the end closures 14 and 15.

In this construction of the scraping blades 30, the shaft 42 for the whipping members and the pivot or swivel bolts 46 are all of such proportion, particularly as to length with respect to the internal longitudinal dimension of the processing chamber defined by cylinder 10 when the ends thereof are closed, that the agitator assemblage having these readily detachable scrapers and beaters, as described, when mounted for operation within the processing chamber, will prevent the possible disengagement of these otherwise readily removable members.

Figures 4 to 7 inclusive show an improved agitator consisting of inner and outer separable members combined with the readily detachable scraping blades 30. In the modified agitator assemblage shown in Figures 4 to 7 inclusive, the agitator is provided with the additional feature that the principal elements thereof, i. e., the outer agitator element and the inner agitator element, are separably constructed so that one may readily be removed from the other.

By this arrangement it is readily feasible to first assemble the outer agitator element in the processing chamber whereupon the inner agitator element may then be assembled into the outer agitator element already positioned in operative position in the processing chamber. Also by this arrangement it is possible for one man to readily assemble a large agitator mechanism within a processing chamber which, if it were not formed of readily separable elements, would normally necessitate more than one man to position a large completely assembled agitator within the freezing cylinder.

In this modified construction of a dasher or agitator for a freezing chamber, the scraping blades 30 are removably and pivotally mounted in apertures 35 on the apertured radial projections 36 and 37 fixed to the outer periphery of the front supporting annulus 48 of the outer agitator element and the rear supporting spider 49 which is fixed to and joined together by rigid longitudinal bracing members 50 and spiral unloading bars 51 with the front annulus 48. The outer agitator assembly generally comprises the scraping blades 30, the bracing members 50 and the unloading bars 51, together with the front annulus 48, the rear supporting spider 49 and the hollow stud supporting and driving shaft 52 centrally fixed to the rear spider 51.

The scraping blades 30 are provided with front and rear pivots 31 and 32 extending from the front and rear offset shoulders 33 and 34 at the back of the scraping blades 30 as well as also being provided with the compression spring 38 telescoped over the rear pivot 32. Due to this unique construction, which has previously been described in detail in connection with the modification of the agitator shown in Figures 1 to 3 inclusive, it is possible to assemble and disassemble the scraping blades 30 upon the modified agitator shown in Figures 4 to 7 inclusive in the same manner as was described in detail with respect to the assembly and disassembly of the scraping blades 30 in connection with the previously described agitator. As in Figures 1 to 3 inclusive, the relative proportions of the agitator, freezing cylinder and scraping blades and details thereof are also of similar nature in the modified construction shown in Figures 4 to 7 inclusive, whereby, upon the closing of the door 14, it becomes impossible for the scraping blades 30 to become detached from their supports.

The inner separable agitator member or element comprises a longitudinally extending shaft 53 to which are fixed two sets of whipping or beating blades 54 and 55 mounted at spaced intervals along the central portion of the shaft 53 alternately arranged with one set of blades at an angle of ninety degrees to the other. The beating or whipping blades 54 and 55 are so inclined to the axes of the shaft 53 that, upon rotation thereof, they will impel the contents of the cylinder or shell 10 in a rearwardly direction.

To facilitate and supplement the whipping or beating of ice cream, whipping rods 56 are provided. These whipping rods 56 are carried by the beater blades 54 and 55 by passing them through openings in these blades and fixing them thereto in any conventional manner such as, for example, by welding.

The rear end of the shaft 53 is supported for rotary motion by a bushing 57 recessed into the aperture in the hollow or quill shaft 52 which supports the head or rear end of the outer agitator member. Bushing 57 is provided with an outwardly turned flange 58 which is recessed into and overlaps the inner central portion of the face of the rear spider 49 of the outer agitator element. A disk element 59 is supported by and sealed to the rear portion of the shaft 53 and is provided with a rearwardly extending flange 60 to sealingly engage the outwardly turned flange 58 of the bushing 57 when the inner dasher element is operatively assembled within the outer dasher element. The inner shaft 53 is supported at its front end by conical stud bearing 61 mounted free to rotate on the front end of the shaft 53 and telescoped into the conical bearing seat 62 in the door 14.

To maintain the front ends of the separable inner and outer agitator members in radial spaced relation, a supporting spider 63 is swiveled on the front end of the shaft 53 intermediate the conical stud bearing 61 and a collar 64 keyed to the shaft 53 immediately ahead of the front beater blades 55. The outer periphery of the spider 63 rotatably engages the inner periphery of the front annulus 48 of the outer agitator member in a bearing contact.

Intermediate the adjacent faces of the spider 63 and the stud bearing 61 a spring 65 and anti-friction annulus or washer 66 are telescoped over and compressed to maintain the spider 63 in engagement with the collar 64 on the shaft 53. To prevent the disengagement of the stud bearing from the shaft 53, a clip ring 67 is engaged in an annular groove 68 in the extreme front end of the shaft 53.

When the combined agitator assemblage is mounted in cylinder 10 the hollow stud shaft 52 which is fixed to and supports the rear end of the agitator member extends out through the aperture in the cylinder head 15 and is swiveled in bushing 69 recessed into the inner end of the aperture in the hollow shaft 52. The bushing 69 is provided with an outwardly extending flange 70 recessed into and overlapping the central portion of the inner face of the cylinder head 15.

When the agitator assemblage is mounted in the cylinder 10 and door 14 is closed, the conical bearing seat 62 engages the conical stud bearing 61 to move it rearwardly along the shaft 53, thereby compressing spring 65 against the front spider 63 which is held in place by collar 64 on shaft 53. This compression of spring 65 biases the inner agitator member for rearward axial movement, whereby the flange 60 of the sealing disk 59 is compressed against the bushing flange 58 recessed in the inner face of the rear spider 49 of the outer agitator member. The outer agitator member 49 is thereby also biased for rearward axial movement within the cylinder 10, causing the annular flange 71 on the rear face of the spider 49 to sealingly engage the outwardly extending flange 70 recessed into the inner face of the cylinder head 15.

In Figure 8 is shown a further modification of the rotatable body or agitator assemblage shown in Figures 3 and 4 to 7 inclusive. Instead of one beating and whipping member, two beating and whipping members have been provided. The shaft 42 has not been provided with beater blades, as illustrated in Figures 3 to 7 inclusive.

For the purpose of simplicity only whipping rods have been shown, which rods are mounted on cross arms 83 fixed to the pivoted shaft 42. The cross arms 83 are fixed to the shaft 42 at spaced intervals along the mid-section of the shaft 42 and the whipping or beating rods 40 are fixed to the cross arms 83 in spaced relation in any conventional manner such, for example, as by welding. The whipping or beating members revolve as a unit with the agitator assembly. To drive the agitator structure as a unit and also drive the whipping and beating elements individually is one of the chief improvements disclosed in the modified agitator of Figure 8.

The modified agitator shown in Figure 8 would, when shown in perspective, appear very similar to the general arrangement of Figure 3, which figure, of course, does not show the separately driven beaters shown in Figure 8. The beaters shown in the modified agitator of Figure 8, though disclosed as being so arranged that their path of rotation does not overlap and does not extend very close to the freezing cylinder 10, may however be constructed in larger proportions and so timed in rotation that their path of rotation overlaps and also sweeps close to the freezing cylinder surface.

The whippers or beaters which are mounted on shaft 42, as shown in Figure 8, are driven separately by imparting to the shaft 42 a rotative movement independent of the rotation of the shaft as a unit with the agitator spiders 21 and 22. To provide such separate independent rotative movement of the shaft 42, and necessarily of the whippers or beaters carried thereby, the supporting shaft 72 of the front spider 21 is provided with clutching faces 73 in the front end thereof to engage complementary clutching faces 74 depressed within the door 14, thereby preventing the rotation of the shaft 72 with the front spider 21.

Shaft 72 is journalled in a central bearing 91 in the front spider 21 and on the opposite end of shaft 72 which extends through the spider 21 is fixed a driving gear 75. The driving gear 75 is provided with a radially extending flange 76 which overlaps and engages the adjacent side of the apertured pinion 77 removably carried on the adjacent end of the shaft 42. The apertured pinion 77 is mounted on the collar 78 fixed to shaft 42. The collar 78 is provided with clutching faces 79 to engage complementary clutching faces on the interior of the apertured pinion 77 thus preventing relative rotary motion between the pinion 77 and the shaft 42.

To prevent axial movement of the pinion 77 on the shaft 42 away from the radial flange 76 on gear 75, a collar or thrust bearing 80 is fixed to the shaft 42 immediately adjacent the collar 78. The collar or thrust bearing 80 is of sufficient diameter to engage the adjacent side of the pinion 77 thus preventing axial motion of the pinion.

The shaft 42 of the whipping or beating mechanism in the agitator of Figure 8 is also provided with the thrust bearing or collar 44 fixed thereto and a compressible spring 45 to enable the retention of, as well as the ready removal of, the whipper or beater mechanism from the agitator assembly by removing the ends of the shaft 42 from the apertures in the front and rear spiders 21 and 22 in which the ends of the shaft are swiveled in accordance with similar previously described removal procedure for similarly mounted elements.

The assembly and disassembly procedure to enable the ready dismantling of the beater or whipper mechanism of the agitator shown in Figure 8 is the same as that described for the assembly and disassembly of the beater or whipper mechanism of the agitator shown in Figure 3. In like manner a conical stud bearing 25 has been provided on the shaft 72 to support the front end of the agitator assemblage by engaging the conical bearing seat 62 in the door 14.

Driving and supporting shaft 28, together with the rotary seal 29, is also fixed to the rear agitator spider 22 for supporting the rear end of the agitator mechanism. Upon the rotation of the outer agitator members comprising the front and rear spiders 21 and 22, respectively, as well as the connecting members, the gear 75 will be held against movement by the engagement of the clutching faces 73 at the end of the shaft 72 with the complementary clutching faces 74 in the door 14 while the remaining elements of the agitator continue to rotate as a unit.

As the gear 75 is held stationary by the shaft 72 it is manifest that the movement of the pinion 77 around this gear by reason of the movement of the said pinion as a unit with the spider 21 will cause independent rotation of the pinion 77 and, therefore, also of the shaft 42 which it engages. By this arrangement an independent rotary movement is imparted to the beaters or whippers carried by the shaft 42 in addition to the rotation of this shaft with the front and rear spiders 21 and 22 as a unit.

Though the agitator with the individually rotatable beating members, as shown in Figure 8, has been disclosed as driven for its individual rotary motion by a stationary gear 75 fixed to the inner end of the shaft 72, a modified agitator may, without any change in principle, be constructed by eliminating the gear 75 and the square front end 73 from the ends of the shaft 72 fixing the shaft 72 to the front annulus 21, enlarging the pinions 77 to extend into close poximity to the wall of the cylinder 10, and providing an internally toothed gear keyed to the inner surface of the freezing cylinder 10 to mesh with the enlarged pinions 77.

In such a modified construction of the agitator shown in Figure 8 the pinions 77 would be caused to rotate individually while being rotated as a unit with the remaining portion of the agitator due to their engagement with the fixed, internally toothed gear on the inner surface of the freezing cylinder 10. Such a construction has not been disclosed in the figures and is referred to only with the thought that it would be an obvious modification.

Figure 9 discloses a modified construction of the rear end portion of the beater blade shaft 42 and the bushing which supports that end of the shaft in the rear annulus 22 and a clip spring which prevents rearward longitudinal motion of the shaft 42, thereby eliminating the use of the compressible spring and spring retaining collar, as illustrated in Figure 8. This same type of modification for the retaining and locking in position of the removable beater members of Figure 8 in their operative position may also be adapted for the same purpose and substituted in place of the compressible retaining springs 45 shown with the removable reaction type beater member in Figure 3, as well as substituted for the spring 38 used in connection with the removable scraping blades throughout the figures in this application. Wherever the compressible spring is used on the readily removable element of the agitator assembly such element is retained in position due to the bias of the spring which prevents the unwarranted longitudinal motion of the removable member which is necessary to enable its ready removal from its pivots.

In Figure 9 is illustrated a locking key 88 which extends through an aperture in the shaft 42 immediately ahead of and adjacent the removable bushing 84 in the rear annuls 22. As is apparent from the inspection of Figure 8 the shaft 42 is prevented from moving longitudinally in a forward direction by the collar fixed to the front end of shaft 42 immediately adjacent the front annulus 21. The key 88 in the key socket 87 in the rear portion of the shaft 42 prevents longitudinal motion of the shaft 42 in a rearwardly direction. By this arrangement the shaft 42 is prevented from longitudinal motion in either direction and thereby locked in position without the use of the compressible spring and retaining collar as illustrated in Figure 8 at the rear portion of the shaft 42. A like arrangement of a compressible locking key can readily be adapted to the retaining of the readily removable scraping blades 30, as well as the reaction beater shown in Figure 3, and thereby eliminate from the removable scraping blades and the reaction type beater the compressible spring shown in Figures 1 to 3 inclusive, whereby these elements are retained in position.

In Figure 10 is shown a cross sectional view taken through the rear section of the shaft 42 of the modified beater blade shaft shown in Figure 9. The locking key 88 consists of a compressible spring arrangement similar in general principle to a hairpin consisting of legs 89 joined at one end by a resilient extension of the legs formed in substantially a loop or eyelet configuration of larger dimension than the aperture through the shaft 42. At the opposite end the legs 89 are provided with outwardly extending projections 90 which, when the key 88 is expanded, overlap and engage the adjacent surface of the shaft 42 but which projections 90 are sufficiently short that, when the legs of the key 88 are pressed together, the outermost extremities of the projections 90 are separated a lesser distance than the width of the oval opening or aperture 87 in the shaft 42.

By this type of construction the key 88, when expanded and in position in the shaft, is definitely locked therein due to the extension of the projections 90 in overlapping engagement with the one side of the shaft and the extension of the loop-like resilient joining element at the other ends of the legs 89 in overlapping engagement with the opposite side of the shaft 42. To withdraw the key 88 from the aperture 87 it is only necessary to compress the legs 89 and the key 88 which may be done by applying pressure to the projections 90 until they are brought together close enough to enable the retraction of the key from the oval aperture 87. By using the oval aperture 87 in the shaft 42 with the largest diameter of the aperture transverse to the axis of the shaft 42, the key 88 will always be maintained in transverse position to the axis of the shaft 42 and any pressure exerted against the key by the engagement of the key with the bushing 84 in the spider 22 will not have a tendency to compress the legs 89 to cause the disengagement of the key 88 from the oval aperture in the end of the shaft which may permit the disengagement of the shaft from its bearings.

Figure 7:
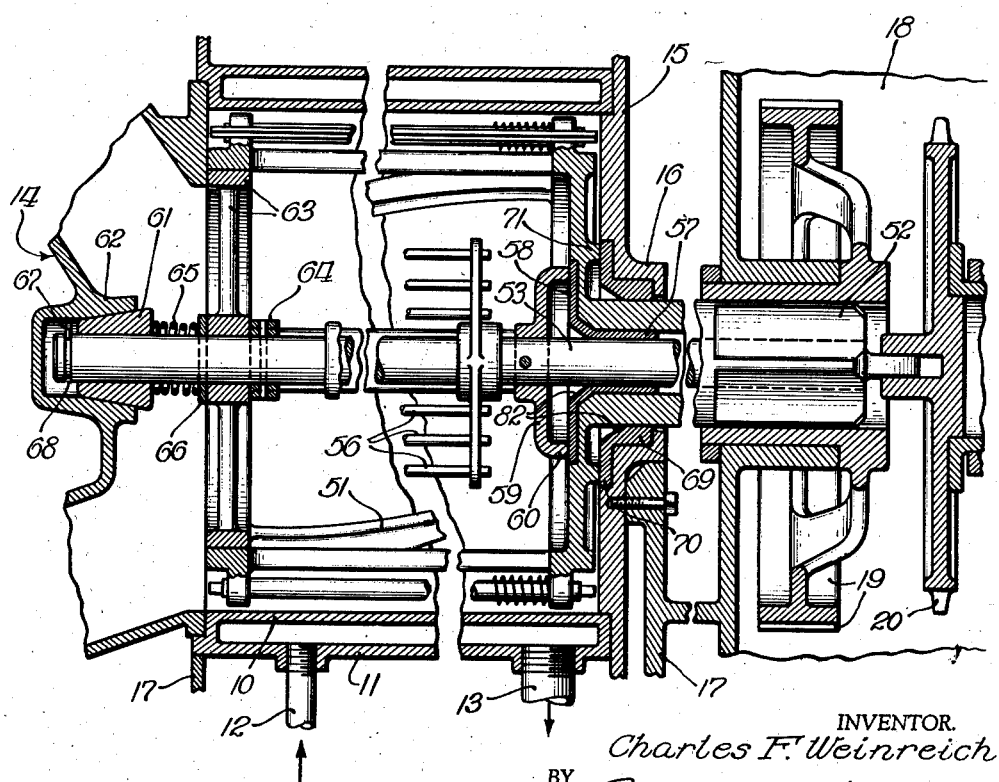
Figure 7 is a longitudinal segmental sectional view partially in broken-away section taken along a vertical plane through the center of the freezing cylinder and driving mechanism of a freezer equipped with the improved agitator shown in Figure 4.

The key 88 can readily be replaced by providing the end of the shaft 42 with an annular groove immediately adjacent the inner surface of the bushing 84 and engaging such a groove by a spring clip similar to the spring clip 67 shown in Figure 7. It is not necessary to explain the details of construction of such a spring clip or the manner in which it is applied or removed. The spring clip, however, will function in the same manner as the key 88 for retaining the removable elements whether they be beater blades or scraper blades in their operative position.

In the various constructions shown in the various figures it would be obvious that the apertures into which the pivots of the removably pivoted elements are inserted must of necessity be provided with sufficient clearance to enable the inclination of the pivots incidental to their insertion or retraction to or from these apertures in the assembling or disassembling of these removable elements. In some instances such clearance may be objectionable. To obviate these objections a removable bushing similar to the bushing 84 shown in Figure 9 may be used.

It is, of course, only necessary to employ such a removable bushing in the pivot aperture adjacent the spring or key end of the element removably retained in operative position. The procedure then followed in assembling such a removable element would be to assemble the bushing onto the end of the shaft which is to be inserted into the aperture with which the bushing is associated. The bushing is slipped onto the shaft a sufficient distance so as not to engage the aperture when the end of the shaft is inserted through the aperture.

When the shaft has been inserted a sufficient distance to enable the insertion of the opposite end of the shaft into its supporting bushing or aperture and the opposite end has been inserted into its bushing or aperture the shaft will then be in axial alinement with its bearing apertures and the removable bushing similar to bushing 84 may then be inserted into its aperture by sliding it along the end of the shaft or pivot. By this procedure the removable element may be removably assembled into bearings by a method which necessitates the inclination of the shaft without providing any undesirable clearance in the supporting bearings or bushings.

If, however, it is not desired to provide the supporting spiders with removable bushings similar to the type 84 shown in Figure 9, a bushing similar to the removable bushing 84 of Figure 9 may be fixed to the spider 22 and provided with a constricted throat 85, which throat constitutes the point of bearing contact between the surface of the shaft 42 and the bushing 84. By providing the constricted throat 85 in the bushing 84 with the expanded ends of the aperture in the bushing it will immediately be obvious that the end of the shaft 42 may be telescoped into the bushing 84 with the shaft 42 at a substantial angle to the axes of the bushing 84, whereby the assembly of the removable elements on the agitator supporting structure is made possible without the allowance of unnecessary clearances in the bearing members which support the removable elements.

From the foregoing description it is manifest that the various modifications of the agitator mechanism including the readily demountable scraping blades, as well as the readily demountable beaters or whippers, together with the separable elemental construction of the agitator, provide a sanitary construction of an agitator for an ice cream freezer or other processing machine in which all of the elements are easily accessible for cleaning when dismantled, easily demountable and yet impossible of dismantling or disengagement when assembled for operation within the processing chamber. One of the modifications of the agitator, specifically the agitator comprised of individually separable inner and outer members, permits the ready assembly of the separable elements of the agitator within the processing chamber, thereby avoiding the difficulty incidental to the assembly of large agitator mechanisms within processing chambers.

To facilitate such ease of assembly and to prevent the damaging of the smooth freezing surface of the cylinder, as well as to prevent the damaging of the bearing surface of the supporting bushings, the outer periphery of the front and rear portions of the outer agitator member has been provided with peripheral projections 81 which will prevent the contacting of the sharp edges of the scraping blades with the smooth surface of the freezing cylinder and will also sufficiently center the agitator mechanism within the cylinder so as to prevent the nicking or damaging of the bearing surface of the shaft supporting bushings when the shaft is inserted into these bushings. To further prevent the nicking of the shaft supporting bushing surface the supporting bushings have been provided with an expanded inner neck 82 which comprises an expanded extension of the bushing aperture. By this construction the rotary sealing elements must contact the outwardly extending flange of the bushing at a point remote from the expanded neck 82, thereby assuring the sealing engagement on a portion of the bushing flange which is sufficiently remote from the center of the cylinder so as not to become nicked or damaged by the insertion of the shaft into the bushing.

The foregoing detailed description has been given for clearness of understanding only and no unnecessary limitations shall be understood therefrom. Various changes in arrangement of the various elements of the freezer, as shown and described to explain the invention, may be made in accordance with the common knowledge of those skilled in the art and yet come within the scope of the invention as set forth in the appended claims.

The invention is hereby claimed as follows:

1. An agitator for use in a material processing device comprising, in combination, inner and outer separable members, means for rotatably supporting one end of said inner member within said outer member, and means removable from the opposite end of said outer member for maintaining the inner member and outer member in spaced relation one to another and for confining said inner member within said outer member, whereby, upon removing, said removable means from said outer member, said inner member may be readily withdrawn from said outer member.

2. A scraping and whipping device for use in an ice cream freezer having a cylindrical processing chamber comprising, in combination, inner and outer readily separable members, an apertured end plate for one end of said cylindrical chamber, shaft means fixed to the adjacent end of one of said separable members and extending outwardly through said apertured end plate for rotatably supporting said adjacent end of one of said separable members within said cylindrical chamber, a closure for the opposite end of said cylindrical chamber, bearing means carried by said closure, shaft means fixed to the end of the other of said separable members adjacent said closure and engaging said bearing means carried by said closure for rotatably supporting said adjacent end of said other of the separable members, and readily separable and removable bearing and sealing means for maintaining said inner and outer separable members in spaced relation one to another both radially and axially of said cylindrical processing chamber when operatively assembled therein, said readily separable bearing means being so constructed and arranged whereby, upon removal of said closure from one end of said cylindrical processing chamber, the one of said separable members may be readily withdrawn from said chamber while the other of said separable members remains in said chamber.

3. An ice cream freezer having a door at one end thereof and an apertured head at the opposite end thereof, agitator means supported for rotary motion within said chamber and having supporting and driving means extending from said chamber through said apertured head, annular bearing and sealing means having the inner end of its aperture expanded and being carried by said apertured head and disposed in said apertured head, complementary bearing and sealing means carried by said agitator means for engaging said annular bearing means remote from its expanded aperture, and means actuated by said door upon closing thereof biasing said agitator means for movement toward said apertured head when said door is closed for yieldably maintaining said bearing means and complementary bearing means in sealing engagement.

4. A scraping and whipping device for use in an ice cream freezer having a cylindrical processing chamber comprising, in combination, inner and outer readily separable members, an apertured end plate for one end of said cylindrical processing chamber, shaft means fixed to the adjacent end of one of said separable members and extending outwardly through said apertured end plates for rotatably supporting the adjacent end of that separable member within said cylindrical chamber, a closure for the opposite end of said cylindrical chamber, bearing engaging means carried by said closure, shaft means for supporting the end of the other of said separable members adjacent said closure and engaging said bearing engaging means carried by said closure for rotatably supporting said adjacent end of the said other of the separable members, readily separable bearing means for maintaining said inner and outer separable members in spaced relation one to another both radially and axially of said cylindrical processing chamber when operatively assembled therein, said readily separable bearing means being so constructed and arranged whereby, upon removal of said closure from one end of said cylindrical processing chamber, the one of said separable members may be readily withdrawn from the said chamber while the other of said separable members remains in said chamber, means fixed to the outer periphery of the outer one of said separable members to substantially center the assembled agitator member within said cylindrical chamber, sealing and bearing means fixed to the outer periphery of said shaft means extending through the aperture in said apertured end plate, and complementary sealing and bearing means carried by said apertured end plate for sealingly engaging the sealing and bearing means fixed to said shaft means, said complementary sealing and bearing means being provided with an aperture having an expanded inner end.

5. In an ice cream freezer having a cylindrical processing chamber, a scraping and whipping agitator member comprising, in combination, an inner agitator element including a supporting shaft therefor, a support for one end of said shaft for said inner element, an outer agitator element supported at one end thereof for rotary motion relative to said inner agitator element by a supporting spider swiveled to the shaft of said inner element adjacent said support therefor, a hollow drive and supporting shaft for the opposite end of said outer element, an apertured end wall for one end of said cylindrical chamber through which apertured end wall said hollow drive and supporting shaft extends, supporting and driving shaft means for the adjacent end of said inner element swiveled to said hollow drive and supporting shaft for said outer element, sealing means carried by said inner and said outer elements for sealing the aperture in said end wall and the aperture in said hollow shaft, and spring means for biasing the inner and outer agitator elements for axial movement relative to the apertured end wall to maintain said elements in relative axial operative position with respect to one another and to maintain said sealing means in sealing engagement to seal said apertures.

6. An agitator for use in a material processing device comprising, in combination, a rotatable body, material moving means detachably pivoted to said rotatable body, and resilient key means carried by said detachable material moving means to normally maintain said material moving means pivoted on and attached to said rotatable body, said material moving means being detachable upon removal of said resilient key means.

CHARLES F. WEINREICH.